Figure 1:
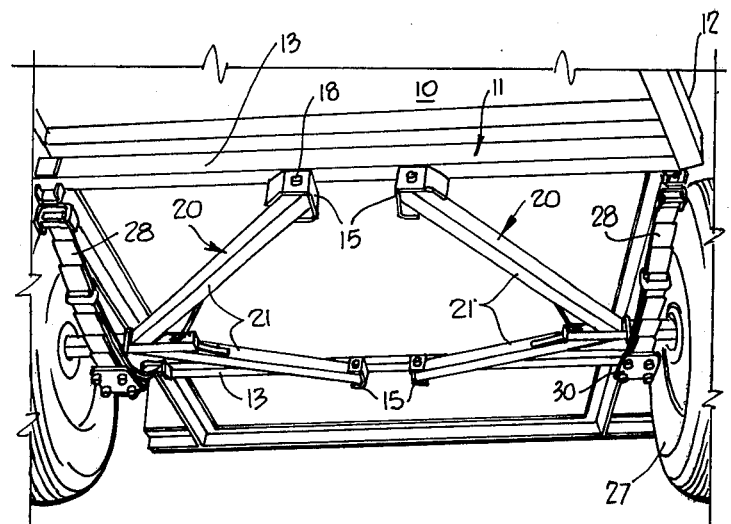

United States Patent [19]

Symons et al.

[11] 4,061,363
[45] Dec. 6, 1977

[54] TRAILER SUSPENSION

[76] Inventors: Cedric Brian Symons; Kenneth Brian Symons, both of 59 Narinna Ave., Cumberland Park, South Australia, Australia

[21] Appl. No.: 635,408

[22] Filed: June 2, 1976

[51] Int. Cl.[2] .............................................. B60G 5/00
[52] U.S. Cl. .................................. 280/718; 267/54 E; 267/56
[58] Field of Search ............... 280/718; 267/19 R, 36, 267/39, 54, 52, 56

[56] References Cited

U.S. PATENT DOCUMENTS

| | | | |
|---|---|---|---|
| 1,289,600 | 12/1918 | Aument | 267/54 E |
| 2,198,099 | 4/1940 | White | 280/718 |
| 3,434,734 | 3/1969 | Poulos | 267/56 |
| 3,726,538 | 4/1973 | Robinson | 280/718 |

Primary Examiner—Philip Goodman
Attorney, Agent, or Firm—Lawrence E. Sklar

[57] ABSTRACT

A trailer suspension and chassis suspension for resisting deflection of tracking of a wheel and including at least one pair of Y-shaped wheel frames each of which has a wheel axle projecting from the joined ends of two diverging frame members, longitudinal pivots joining the other ends of the frame members to the chassis and a leaf spring between each Y-frame and the chassis and secured to the Y-frame, the leaf spring ends being in longitudinal slidable abutment with abutment means on the chassis.

6 Claims, 6 Drawing Figures

TRAILER SUSPENSION

This invention relates to suspension means suitable for suspension of vehicles, and which is particularly suitable for a trailer suspension.

BACKGROUND OF THE INVENTION

Most trailer suspensions incorporate leaf springs, mainly for the reason that the snubbing action caused between the leaves of the spring upon its deflection reduces the need for a separate shock absorber. As is well known, most trailers are required to function under a very wide range of loads, and shock absorbers suitable for such wide ranges of loads are difficult to construct. If a shock absorber is suitable for a very heavy load, it is likely to be excessively stiff for a lightly loaded trailer.

The usual leaf spring arrangement of a trailer utilises an axle extending between two ground engaging wheels, the axle being bolted to the centre of each of two leaf springs, each leaf spring being hinged at one end to the chassis of the trailer and coupled by means of a shackle at the other end. However upon a large degree of deflection taking place, the centre of the spring moves in a longitudinal direction with respect to the direction of travel. In many instances this is not of great importance, provided the two springs are deflected simultaneously by approximately the same amount. Sometimes however one spring is deflected more than the other, (particularly when the springs are unevenly loaded) and the combined effect of flattening the spring and pivoting it about its mounting at one end causes only that wheel supported by that spring to move in a longitudinal direction (usually rearwardly) with respect to the trailer. This in turn causes the axle to be deflected from its transverse position with respect to direction of travel, and the result is that the trailer is caused to move in a direction which deviates from its previous straight line movement. This is one of the reasons why trailers tend to cause the towing vehicle to "snake" or sway while being towed.

One of the objects of this invention is to provide a trailer suspension wherein the tracking of the wheels is less likely to be influenced by uneven spring deflection.

It is already known that a suspension for a vehicle can incorporate a Y ("wishbone") shaped wheel frame wherein a coil spring is compressed by the load of the vehicle, the coil spring extending between a hinged Y ("wishbone") frame and the vehicle chassis. However these hinged frames are of the pantograph type, incorporating two pairs of bearings to control the wheel movement, and the design is such that the interface between wheel tyre and road is not displaced upon hinge deflection, but the wheel tilts transversely. The use of two pairs of bearings and the further use of a shock absorber subject to the disabilities described above, not only greatly adds to the cost of construction but also results in a construction which is not sufficiently "stiff" to avoid deviation of direction under rough road conditions.

Various alternatives have been proposed, which have met with some success.

For example, in the U.S. Pat. No. 2,062,874 issued to Filton, there was described a device wherein a vertical bearing member constrained wheel axle movement against longitudinal displacement, and in the U.S. Pat. No. 2,085,662 issued to Johnson there was disclosed an arrangement wherein some longitudinal displacement occurred upon spring deflection, but independent springing of two transversely aligned wheels avoided transverse deflection such that direction of travel was influenced.

BRIEF SUMMARY OF THE INVENTION

With the object of providing a trailer suspension and chassis construction which will resist deflection of tracking of a wheel upon deflection of its supporting spring, and which will also reduce the need to use shock absorbers, this invention may be summarised as including at least one pair of "Y" shaped wheel frames each of which has diverging frame members which join together at one end from which a wheel axle projects, a longitudinal bearing in each of the other ends of the frame members pivotally supporting the frame members from the chassis, and a leaf spring fixed relative to the wheel axle and reacting between the joined ends of the members and the vehicle chassis, the ends of the leaf spring being in longitudinal slidable abutment with abutment means on the chassis.

With this arrangement, the construction can be exceedingly simple, the frame members for example being straight lengths of tubular metal, and the abutment means, which can be pads themselves pivotal about longitudinal axes.

The invention is defined as a trailer suspension and chassis construction comprising a chassis, at least one pair of "Y" shaped wheel frames each of which has a pair of frame members, means joining the frame members together at one end to diverge therefrom, and a wheel axle projecting from the joined ends, pivot means joining the divergent ends of the frame members of each respective wheel frame to the chassis for independent pivotal movement of the frames about axes which extend longitudinally with respect to the direction of travel, a leaf spring fixed intermediate its ends with respect to the wheel axle, and abutment means on the chassis, the leaf spring ends being in longitudinally slidable abutment with said abutment means.

With this invention, the pivot means is essentially above the road surface, so that there is a tendency for the interface between the wheel tyre and the road to move, or skid, outwardly slightly, upon spring deflection caused by the tyre encountering a bump in the road. The pressure between the tyre and the road also increases at the same instant, and this resists the outward skid movement of the tyre, thus temporarily "stiffening" the suspension under the dynamic forces. This has a stabilising effect which is additional to the absence of directional deviation of the wheel, and results in excellent stability of towed vehicle. Surprisingly, tests have now indicated that tyre wear is reduced with this invention, showing that the "stiffening" of the suspension under dynamic forces is accompanied by very little sideways scrubbing of the tyres. It appears that the tyre side walls function to some extent as transverse shock absorbers under the above-described conditions. The towing "feel" is greatly improved, and lateral or vertical plane instability reduced over all other suspensions with which this has yet been compared by the Inventor.

Figure 2:
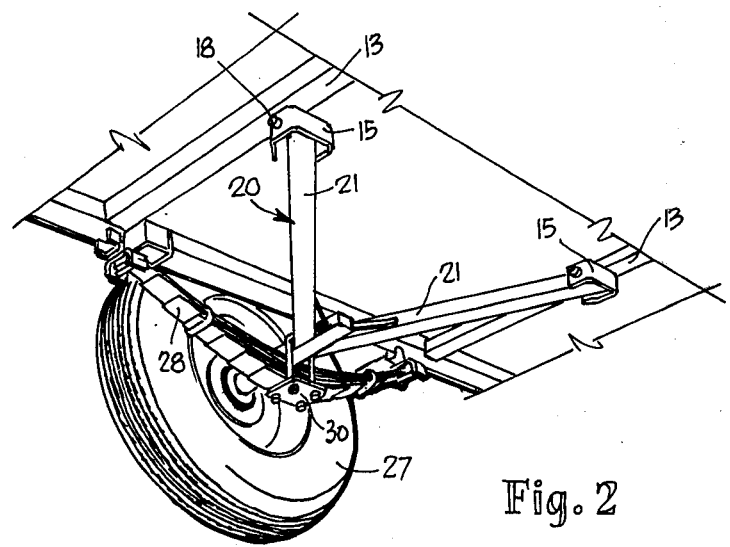
Figure 3:
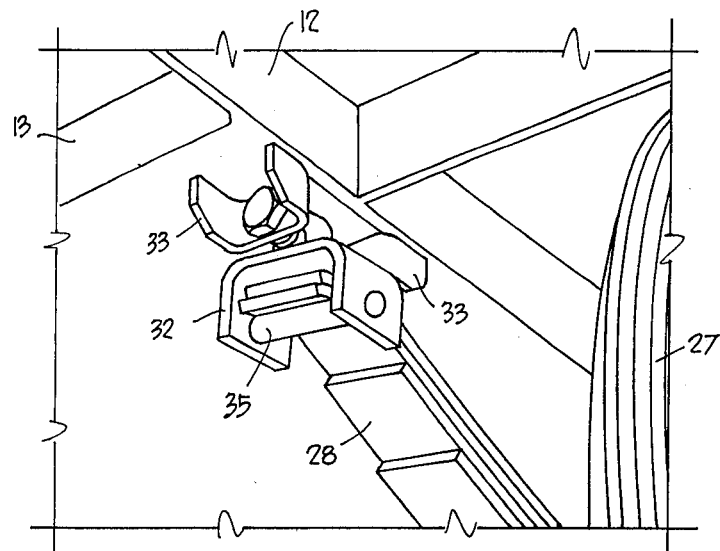
Figure 4:
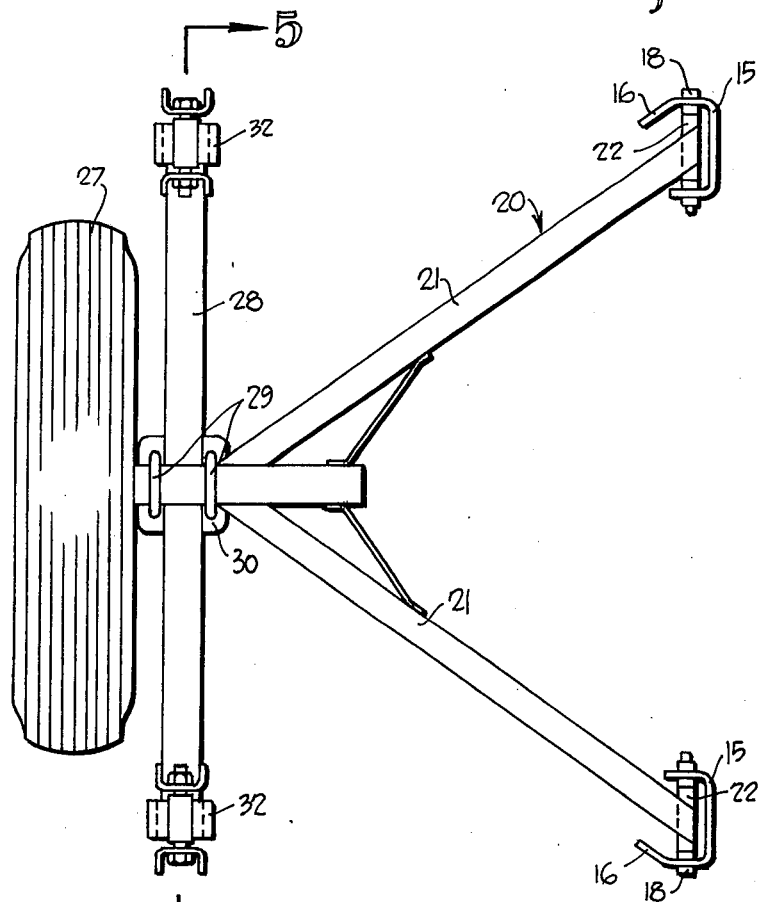
Figure 5:
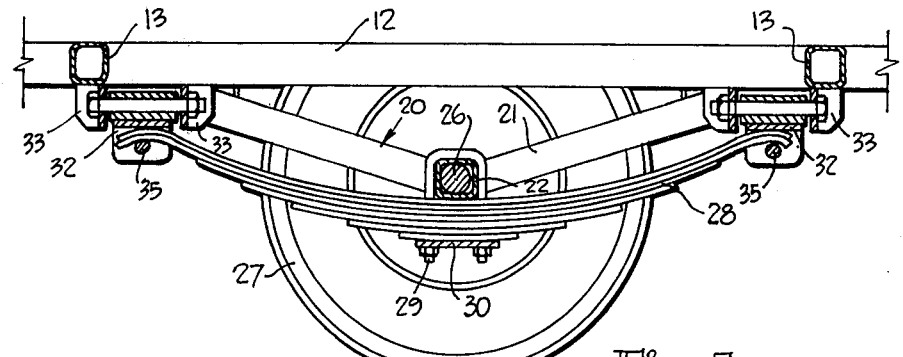
Figure 6:
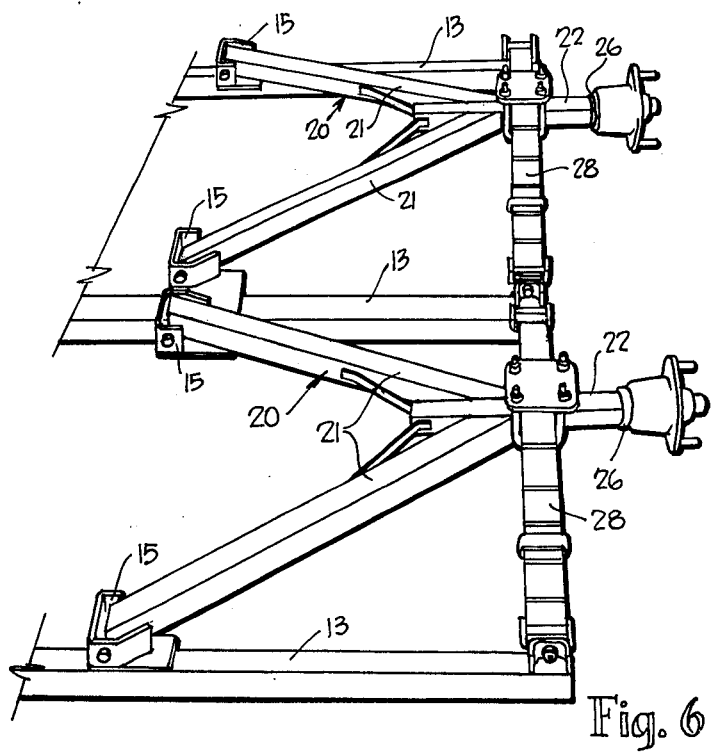

Two embodiments of the invention are described hereunder in some detail with reference to and are illustrated in the accompanying drawings in which:

FIG. 1 is a fragmentary perspective underside view of a trailer which incorporates a suspension constructed according to a first embodiment of the invention, FIG. 2 is a fragmentary perspective view of a wheel and wheel frame, viewed from a different angle, FIG. 3 is a fragmentary perspective view of a leaf spring abutting pad, FIG. 4 is a plan view of a wheel frame and wheel assembly, FIG. 5 is a section taken on line 5—5 of FIG. 4, and FIG. 6 is an underside perspective view but showing a second embodiment wherein two wheel frames are placed in tandem.

According to the first embodiment of FIGS. 1 to 5 which is the most widely applicable embodiment of the invention, a trailer 10 is provided with a chassis 11 having longitudinal members 12 and cross members. Two of the cross members are spaced one fore and the other aft of a transverse central plane of the trailer 10, and each of these members is provided with a pair of bearing brackets 15. Each bearing bracket 15 is formed from a flat bar of metal which is bent to a general U shape, but provided with an extention 16 of one of the flanges to provide greater stability and provide greater weld bead length between the bracket 15 and the chassis cross member 13 to which it is welded. The bracket 15 is apertured at one end and an aligned aperture threaded at the other, and a high tensile bearing bolt 18 passes through the aperture and threadably engages the thread, the bearing bolt being locked in position by means of a lock nut and lock washer. A "Y" shaped wheel frame 20 is formed from three tubular (or solid) members, two of these members designated 21 sloping at an angle of between 30° and 45° with respect to the transverse plane of the trailer, and being joined at their outer ends to the third member 22 which is an axle member. The inner ends of the frame members 21 terminate in tubes 23 (FIG. 4) which contain bearings, or alternatively which constitute bearings, and the tubes 23 terminate at their ends contiguous with the facing surfaces of the flanges of the U shaped brackets 15. Plastic washers (not shown) function to contain grease within the tubes, and each tube is provided with a grease nipple (also not shown) situated centrally. This forms very simple bearing means for swivelling of the wheel frames about respective longitudinal axes.

The axle member 22 extends transversely from the joined ends of the other two frame members, and has welded into it a stub axle 26 to form an axle assembly. The stub axle 26 carries a pneumatic tyred wheel 27.

A leaf spring 28 comprising a plurality of leaves is bolted to the transversely extending axle member 22 by means of U bolts 29 which pass through a clamping plate 30 while the fore and aft ends of the spring abut bearing abutment pads 32, which are pivoted between brackets 33 welded to the longitudinal chassis members 12. Each bearing abutment pad is a U shaped plate having depending flanges which flank the spring, and which are joined by a transverse pin 35, the spring having a downturned end which engages the pin but only under unladen conditions, thus keeping the wheel in position.

As the wheel frames 20 move and the springs 28 deflect the angle of the springs with respect to the plane of the chassis varies due to arc movement of the spring. To accommodate these variations the abutment plates are themselves carried on longitudinal bearing pins 37 which accommodate the angle of arc in any position allowing the spring end to slide back and forth on the abutment pads 32 and also with a slight sideways movement. These pins 37 pass through the respective brackets 33, which are welded to the chassis 11.

This avoids any twisting of the spring ends (or the spring itself) which ensures that the ends receive the maximum bearing surface at all points of deflection of the spring which will occur under dynamic load. Twisting load which might otherwise be applied to the springs (for example due to manufacturing errors) is also avoided.

A consideration of the above embodiment will indicate that the invention provides very considerable strength for the wheel suspension because of the triangulation effect of each of the wheel frames 20. It will be seen that the springs are floating at their ends and are tied only in the centre. This ensures that deflection of the springs will not impart any variation of track direction of the trailer. It will be seen that the towing load is transmitted through the trailer chassis to the wheel frames solely through the wheel frame bearing bolts 18. It will also be seen that the members which are utilised are straight, and therefore unlikely to be damaged due to excess deflection such as could occur in the event of the frame members being bent.

It will be appreciated that the production cost of the axle assemblies is similar to the production cost of a single long axle, and that the invention is suitable for mass production techniques. The spring length can be the same as or less than the distance between the divergent ends of a "Y" frame so that the assembly can be contained in a rectangular envelope space (in plan).

However the invention need not necessarily be limited to the above embodiment utilising only two springs and only two wheel frames. According to the second embodiment of FIG. 6 a tandem trailer also embodies the invention, the tandem trailer being provided with axle assemblies which are as close as possible to one another. Each wheel is carried on a stub axle 26 projecting outwardly from a central axle member 22 as previously. The springs 28 are attached to the adjacent axle members as in the first embodiment. The ends of the diverging frame members terminate in bearing means as described in respect of the first embodiment but it will be appreciated that all four wheels are independently sprung. The spring ends engage the pivoted abutment pads as in the previous embodiment.

A consideration of the above embodiments will indicate that the invention results in a trailer which is much safer than many previously proposed trailers, and wherein the parts are of rugged construction, and are suitable for production by mass production techniques.

We claim:

1. A trailer suspension and chassis construction, comprising a chassis, at least one pair of Y-shaped wheel frames each of which has a pair of frame members, means joining the frame members together at one end to diverge therefrom, and a wheel axle projecting from the joined ends, pivot means joining the divergent ends of the frame members of each respective wheel frame to the chassis for independent pivotal movement of the frames about axes which extend longitudinally with respect to the direction of travel, a respective leaf spring fixed intermediate its ends with respect to each said wheel axle, abutment pads on the chassis, the leaf spring ends abutting respective said abutment pads, each said abutment pad being of inverted "U"-shape and having a pair of depending flanges which flank a respective said spring end, the space between said flanges exceeding the width of the spring end flanked thereby to allow the spring end to slide back and forth on the abutment pads and to have a slight sideways movement, and further comprising bearing means joining respective said abutment pads to said chassis for pivotal movement of the abutment pads about longitudinally extending axes.

2. A trailer suspension according to claim 1 wherein said bearing means comprises a bearing bolt.

3. A trailer suspension according to claim 1 wherein each said abutment pad is provided with a transverse pin extending between the flanges, that said spring end which engages a said abutment pad being a downturned end which is so spaced from the transverse pin that it engages the transverse pin only upon unladen conditions occurring.

4. A trailer suspension according to claim 1 wherein said pivot means joining the divergent ends of each Y-shaped frame member to the chassis comprise a bearing bracket secured to the chassis, a tubular member secured to the inner end of each respective frame member of that frame, a bearing in the tubular member, and a bearing bolt extending through the bearing and secured to the bearing bracket.

5. A trailer suspension according to claim 1 wherein there are two said pairs of Y-shaped wheel frames supported by four wheels arranged in two pairs, one pair of wheels being in tandem relationship to the other.

6. A trailer vehicle having a chassis, a pair of Y-shaped wheel frames each of which has a pair of frame members, means joining the frame members together at one end to diverge therefrom, and a wheel axle projecting from the joined ends, pivot means joining the divergent ends of the frame members of each respective wheel frame to the chassis for independent pivotal movment of the frames about axes which extend longitudinally with respect to the direction of travel, a respective leaf spring fixed intermediate its ends with respect to each said wheel axle, abutment pads on the chassis, the leaf spring ends abutting respective said abutment pads, each said abutment pad being of inverted "U"-shape and having a pair of depending flanges which flank a respective said spring end, the space between said flanges exceeding the width of the spring end flanked thereby to allow the spring end to slide back and forth on the abutment pads and to have a slight sideways movement, and further comprising bearing means joining respective said abutment pads to said chassis for pivotal movement of the abutment pads about longitudinally extending axes.

* * * * *